US012618813B2

(12) United States Patent
Chen et al.

(10) Patent No.: US 12,618,813 B2
(45) Date of Patent: May 5, 2026

(54) METHOD FOR DETECTING GLYCOSIDIC BONDS OF PLANT POLYSACCHARIDES

(71) Applicant: ZHEJIANG UNIVERSITY, Hangzhou (CN)

(72) Inventors: Shiguo Chen, Hangzhou (CN); Kai Zhu, Hangzhou (CN); Xingqian Ye, Hangzhou (CN); Zhiqiang Hou, Hangzhou (CN); Jinghua Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 281 days.

(21) Appl. No.: 18/373,398

(22) Filed: Sep. 27, 2023

(65) Prior Publication Data

US 2024/0302336 A1 Sep. 12, 2024

(30) Foreign Application Priority Data

Mar. 6, 2023 (CN) .......................... 202310235420.7

(51) Int. Cl.
*G01N 30/72* (2006.01)
*G01N 30/02* (2006.01)
*G01N 30/06* (2006.01)

(52) U.S. Cl.
CPC ... *G01N 30/7233* (2013.01); *G01N 2030/027* (2013.01); *G01N 2030/067* (2013.01)

(58) Field of Classification Search
CPC ......... G01N 30/7233; G01N 2030/027; G01N 2030/067; G01N 30/88; G01N 30/06;
(Continued)

(56) References Cited

U.S. PATENT DOCUMENTS

2011/0204222 A1* 8/2011 Patell ........................ A61P 3/10
250/282
2011/0301063 A1* 12/2011 Netzel .................... G01N 30/72
506/12
(Continued)

OTHER PUBLICATIONS

Galermo, Ace G et al., Liquid ChromatographyâTandem Mass Spectrometry Approach for Determining Glycosidic Linkages, Analytical chemistry (Washington) 90.21 (2018): 13073-13080 (Year: 2018).*

*Primary Examiner* — David J Bolduc

(57) ABSTRACT

The present invention relates to a method for detecting glycosidic bonds of plant polysaccharides. The method includes taking 100 μL of NaOH-DMSO suspension (1 mg/mL) of plant polysaccharides containing 20 or more kinds of substances such as galactan, araban, polygalacturonic acid, rhamnogalacturonan-I, rhamnogalacturonan-II, xyluronic acid, arabogalacturonic acid I and arabogalacturonic acid II, shaking at room temperature for 30 minutes, adding 40 μL of iodomethane and shaking for 1 hour. Such process is repeated three times to obtain methylated plant polysaccharides. The method further includes using an automatic detection equipment for methylation combined with PMP derivatization to analyze glycosidic bonds in polysaccharides. Not only the glycosidic bond information of neutral sugars can be analyzed in the subsequent LC-MS mass spectrometry analysis, but also the glycosidic bond information of acidic sugars can be resulted, and the analysis results are faster, more detailed and more reliable.

2 Claims, 4 Drawing Sheets

(58) Field of Classification Search
CPC ........... G01N 2030/8836; G01N 30/02; G01N 30/72; Y02P 20/55
See application file for complete search history.

(56) References Cited

U.S. PATENT DOCUMENTS

2013/0309703  A1*  11/2013  Takegawa ........... G01N 21/6486
                                                   435/18
2020/0041470  A1*   2/2020  Carell ................. H01J 49/0045
2022/0236283  A1*   7/2022  Flütsch .................. G01N 30/88

* cited by examiner

METHOD FOR DETECTING GLYCOSIDIC BONDS OF PLANT POLYSACCHARIDES

CROSS-REFERENCE TO RELATED APPLICATIONS

The present application claims priority of Chinese Patent Application No. 202310235420.7 filed on Mar. 6, 2023, the entire contents of which are hereby incorporated by reference.

TECHNICAL FIELD

The invention relates to a method for detecting glycosidic bonds of plant polysaccharides.

DESCRIPTION OF THE PRIOR ART

Plant polysaccharide, an important component of plant cell wall, is a kind of natural high molecular polymer formed by aldose or ketose linked by glycosidic bonds. The rich biological activity of polysaccharide has a close relation to its complex structure. Polysaccharide structure includes molecular weight and distribution, monosaccharide composition and molar ratio, glycosidic bond connection mode, repeating structural unit and branching degree, etc. There are many methods to characterize the structure of polysaccharide, including chemical methods, instrumental analysis methods, etc. However, the structure of polysaccharide is complex and requires a combination of multiple methods for analysis.

Glycosidic bond is a specific type of chemical bond that connects an aglycon to a sugar group or a sugar group to a sugar group in a glycoside molecule. Analyzing the glycosidic bonds of plant polysaccharides is an important step for analyzing the fine structure of polysaccharides. Common chemical analysis methods include methylation derivatization, acid hydrolysis, etc., using gas chromatography-mass spectrometry (GC-MS) for analysis. However, such methods have problems such as time-consuming, cumbersome operation, and loss of fine structure. LC-MS detection (liquid chromatography-mass spectrometry detection) is a cutting-edge technology in the field of sugar analysis. It has the advantages of high separating capacity, high sensitivity, high efficiency, and small sample volume, and realizes the separation and fine structure identification of complex oligosaccharides, showing great potential in the study of the fine structure of polysaccharides. By combining methylation with LC-MS technology, it is possible to quickly and efficiently determine the glycosidic bonds of plant polysaccharides in a micro-volume. However, the existing data show that it can only analyze the glycosidic bond information of neutral sugars, but cannot give the glycosidic bond information of acidic sugars.

SUMMARY OF THE DISCLOSURE

The purpose of the present invention is to address the deficiencies in the prior art, to provide a method for detecting glycosidic bonds of plant polysaccharides to comprehensively analyze more than 90 glycosidic residues, cover all glycosidic bond types in plant polysaccharides, especially to give the glycosidic bond information of acidic sugars, and the analysis results are more authentic and reliable.

The present invention adopts the following technical scheme: a method for detecting glycosidic bonds of plant polysaccharides, comprising the following steps:

(1) performing rapid methylation of the plant polysaccharides in a micro-volume;

(2) derivatizing glycosidic residues of the methylated plant polysaccharides with PMP reagent (derivatization reagent); and (3) performing mass spectrometry analysis by LC-MS in MRM mode.

Further, the method includes the following steps:

(1) dispersing the plant polysaccharides in 100 μL of NaOH-DMSO suspension to a concentration of 1 mg/mL and shaking at room temperature for 30 minutes, and adding 40 μL of iodomethane and shaking for 1 hour; repeating three times to obtain the methylated and substituted polysaccharides;

(2) placing the methylated and substituted polysaccharides in an ice bath, adding 500 μL of water of 0° C. to terminate reaction, and standing for 10 minutes;

(3) adding 800 μL of dichloromethane and shaking for 30 seconds, and removing supernatant;

(4) repeating steps (2) and (3) three times; then drying a lower organic layer with nitrogen to obtain partially methylated glycoside residues;

(5) adding 100 μL of 2 M trifluoroacetic acid to a product resulted from step (4), hydrolyzing at 100° C. for 8 hours, and blow drying with nitrogen after hydrolysis;

(6) adding 100 μL of 0.2 M PMP methanol solution to a product resulted from step (5), and heating in a 70° C. water bath for 30 minutes to obtain partially methylated PMP-derived glycoside residues; and (7) taking a product resulted from step (6) out, cooling at room temperature, drying in vacuum, dissolving in 1 mL of 70% methanol aqueous solution, and analyzing qualitatively and quantitatively by LC-MS in MRM mode.

Further, the plant polysaccharide is citrus pectin, as citrus pectin has a complex structure and diverse composition, and is representative. By subjecting the citrus pectin to methylation derivation with the present inventive method, it can be concluded that the present inventive method has a general applicability for plant polysaccharides. The plant polysaccharide can also use apple pectin, mulberry polysaccharide, pomelo peel pectin, wolfberry polysaccharide, bayberry leaf polysaccharide, raspberry polysaccharide, etc. . . . .

The beneficial effects of the present invention are: the methylation combined with PMP derivatization of the present invention is used to analyze the glycosidic bonds in polysaccharides, so not only the glycosidic bond information of neutral sugars can be analyzed in the subsequent LC-MS mass spectrometry analysis, but also the glycosidic bond information of acidic sugars can be resulted, and the analysis results are faster, more detailed and more reliable.

DESCRIPTION OF EMBODIMENTS

Figure 1:
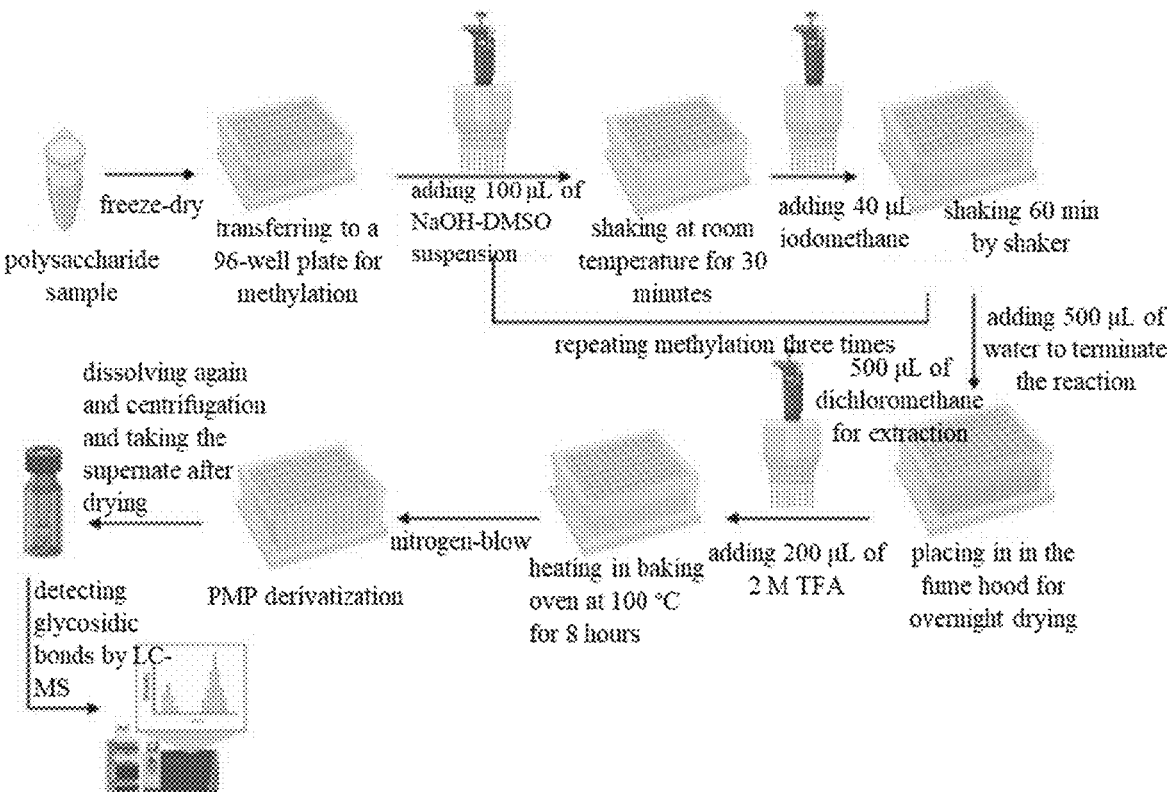
FIG. 1 is a schematic diagram of the method for detecting the glycosidic bonds of plant polysaccharides of the present invention.
Figure 2:
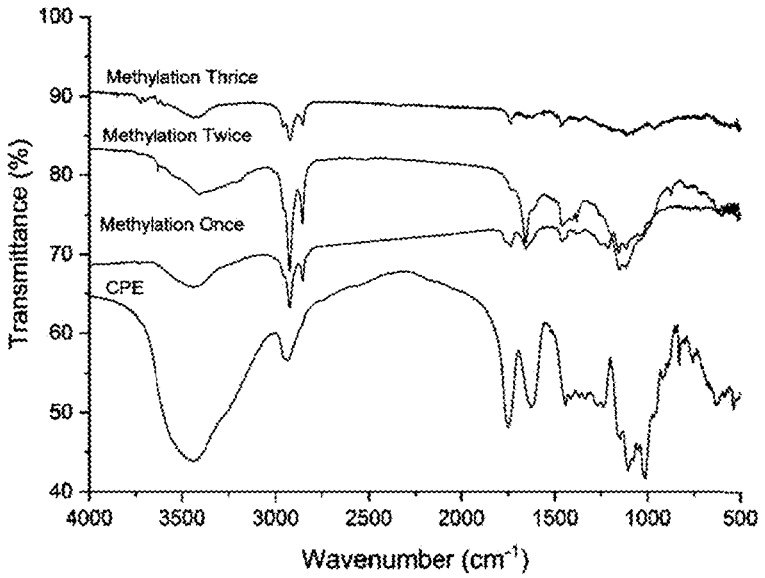
FIG. 2 is an infrared spectrogram before and after methylation of citrus pectin using the method for detecting the glycosidic bonds of plant polysaccharides of the present invention.

In order to further explain the technical solutions and effects of the present invention for the purpose of the invention, the specific embodiments, features and effects of the present invention will be described in detail below in conjunction with the accompanying drawings.

The plant polysaccharides of the present invention are polysaccharides produced by metabolism of plant cells which have degree of polymerization of more than 10, which, generally, contains 20 or more kinds of substances such as galactan, araban, polygalacturonic acid, rhamnogalacturonan-I, rhamnogalacturonan-II, xyluronic acid, arabogalacturonic acid I and arabogalacturonic acid II.

In the following examples, the NaOH-DMSO suspension was prepared by the following method: using a pipettor to add 1 ml of 50% NaOH (mass fraction) to a 50 ml centrifuge tube, adding 2 ml of anhydrous methanol and eddying for 10 seconds, wherein the solution should be transparent, further adding 20 ml of DMSO and eddying for 5 seconds, herein the solution should be opaque, using a centrifuge tube for centrifuge at 6000 rpm and 25° C. for 5 minutes, with a gelatinous substance at the bottom of the tube, and the top DMSO layer being removed, and adding 20 ml of new DMSO for washing and repeating for five times until there is no white precipitate at the bottom. Eventually, NaOH is dispersed in 20 ml of DMSO for use, and the concentration of NaOH was 0.5 g/L.

Example 1: A Method for Detecting Glycosidic Bonds of Plant Polysaccharides

As citrus pectin contains various plant polysaccharides such as galactan, araban, and polygalacturonic acid, citrus pectin was selected as an exemplified representative to verify that the efficiency of this method for methylation of plant polysaccharides.

(1) The methylation reaction process is shown in FIG. 1. Taking citrus pectin as an example, 100 μL of citrus pectin (Ji'nan Shenghe Chemical Co., Ltd.) with NaOH-DMSO suspension (1 mg/mL) was added to a 96-well plate for each well, and shaken at room temperature for 30 minutes: 40 μL iodomethane was added therein, and shaken for 1 hour. Such process is repeated three times to obtain methylated polysaccharides.

(2) The 96-well plate was placed in an ice bath, and 500 μL of ice-cold water was added to each well to terminate the reaction. Iodomethane was no longer dissolved, and the solution became opaque and the 96-well plate was taken out after standing for 10 minutes.

(3) 800 μL of dichloromethane was added into the 96-well plate in the fume hood, shaken for 30 seconds, and the upper aqueous layer was removed with a plastic straw of 1 mL.

Figure 3:
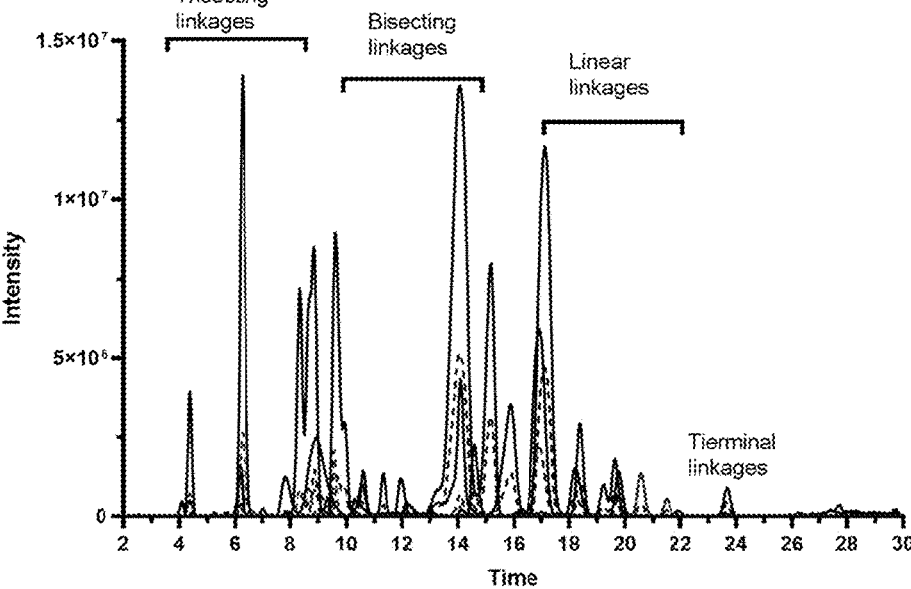
FIG. 3 is a MRM glycosidic bond reference map by LC-MS after the partial methylation-PMP derivation of the monosaccharide standard product using the method for detecting the glycosidic bonds of plant polysaccharides of the present invention.
Figure 4:
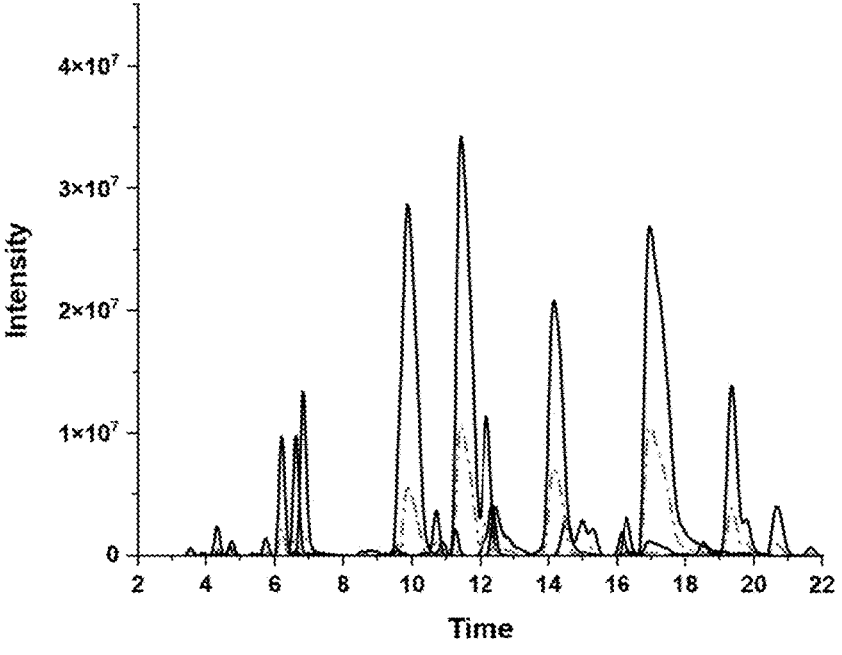
FIG. 4 is a MRM chromatogram of the araban after high-throughput methylation-PMP derivatization using the method for detecting the glycosidic bonds of plant polysaccharides of the present invention.

(4) 500 μL of ice-cold water was added therein again for extraction by repeating the steps (2) and (3) three times, and finally the bottom organic layer was remained and dried with nitrogen to obtain partially methylated glycoside residues. FIG. 3 shows that after repeating the methylation reaction three times, the absorption peak of the hydroxyl group at 3500 cm-1 detected by the infrared spectrum of citrus pectin is significantly reduced, and the methylation reaction is complete.

(5) 100 μL of 2 M trifluoroacetic acid (TFA) was added to the above-mentioned 96-well plate containing the dried sample, and hydrolyzed at 100° C. for 8 hours. The sample was dried in a nitrogen environment to obtain partially methylated PMP-derived glycoside residues.

(6) 100 μL of 0.2 M PMP methanol solution was added to the above-mentioned 96-well plate containing the dried sample, and heated in a 70° C. water bath for 30 minutes. The sample was taken out and cooled at room temperature and dried in vacuum, dissolved in 1 mL of 70 v/v % methanol, and subjected to qualitative and quantitative analysis of mass spectrometry by LC-MS in MRM mode.

The analysis result of glycosidic bonds of citrus pectin by LC-MS is shown in Table 1. The analysis result shows that citrus pectin has at least 36 different glycosidic bonds, and the top ten sugar residues with the highest abundance observed (based on the relative peak area %) are 4-GalA (39.31%), 5-Ara (9.24%), 6-Glc (8.04%), 4-Gal (7.26%), 2,4-Rha (5.436%), 4-Xyl (5.12%), 3,5-Ara (3.15%), 2,X-Ara (2.58%), 6-/3-Gal (1.9%), 2,X-Xyl (1.81%). Furthermore, the glycosidic bonds are clustered according to the types and structures of plant polysaccharides, and it is inferred that the main chain of CPE is the pectin HG domain (41.12%) of 1,4-linked GalA, and the side chain, which is mainly composed of galactan (9.12%). %), highly branched araban (15.98%) and AG-I/AG-II (4.37%), including a small amount of XGA structure (0.43%), is linked to the Rha of RG-I through O-4, and xylose is linked to GalA in HG via 1,2 or 1,3 glycosidic bond. In addition, the inventor speculates that there may be about 4.58% RG-II domains, which is consistent with the proportion of RG-II domains reported in related citrus pectin studies. Meanwhile, about 10.19% of 1,6-linked dextran and 8.35% of xylan are found in CPE.

TABLE 1

| Linkage residue | CP |
| --- | --- |
| X,X-/4,6-Man$^a$ | 0.21 (±0.18) |
| Others c | 0.21 |
| 2,X-Fuc | 1.73 (±0.78) |
| 3,4-Fuc | 0.34 (±0.17) |
| 2-Fuc | 1.53 (±1.12) |
| 3-Fuc | 0.48 (±0.2) |
| T-Fuc | 0.48 (±0.67) |
| RG-II | 4.56 |
| 3,4-/3,6-Gal | 1.05 (±0.64) |
| 6-/3-Gal | 1.9 (±0.71) |
| AG-I/AG-II | 2.95 |
| 2,X,X-/2,4,6-Gal | 0.27 (±0.12) |
| 2,X-/2,4-Gal | 0.32 (±0.24) |
| 4,6-Gal | 0.83 (±0.55) |
| 4-Gal | 7.26 (±0.51) |
| T-Gal | 0.4 (±0.28) |
| Galactan | 9.08 |
| 2,X-GalA | 1.21 (±0.18) |
| 3,4-GalA | 0.02 (±0.03) |
| 4-GalA | 39.31 (±2.03) |
| T-GalA | 0.41 (±0.28) |
| HG | 40.95 |
| 2,X-/2,3-Glc | 0.83 (±0.55) |
| X,X-Glc | 0.48 (±0.05) |
| 4,6-Glc | 0.1 (±0.09) |

TABLE 1-continued

| Linkage residue | CP |
|---|---|
| 6-Glc | 8.04 (±2.22) |
| T-Glc | 0.7 (±)0.16 |
| Glucan | 10.15 |
| 2,4-Rha | 5.43 (±0.66) |
| 2-Rha | 1.00 (±0.87) |
| T-Rha | 0.56 (±0.8) |
| RG-I | 6.99 |
| 2,X-GlcA | 0.18 (±0.19) |
| 2,X-Xyl | 1.81 (±0.8) |
| 4-Xyl | 5.12 (±3.43) |
| X-Xyl | 1.2 (±0.16) |
| Xylan | 8.31 |
| T-Xyl | 0.47 (±0.39) |
| Xylan/XGA | 0.47 |
| 2,X-Ara | 0.58 (±)2.39 |
| 3,5-Ara | 3.15 (±)3.22 |
| 5-Ara | 9.24 (±)4.42 |
| 3-Ara | 1.19 (±)1.85 |
| 2-Ara | 0.63 (±0.33) |
| T-Ara | 1.54 (±0.11) |
| Arabinan | 16.33 | a, "X" represents the detected glycosidic bond whose exact connection position cannot be determined; n.d. Not detected;

b, the relative percentage of sugar residues is calculated based on the peak area;

c, the sugar chains that the sugar residues may come from are assigned;

The present embodiment uses citrus pectin as an example as citrus pectin contains galactan, araban, polygalacturonic acid, rhamnogalacturonan-I, rhamnogalacturonan-II, xyluronic acid, arabogalacturonic acid I and arabogalacturonic acid II, and thus has a complex structure, diverse composition, and is representative. By subjecting the citrus pectin to methylation derivation with the present inventive method and according to the high-precision detection results, it can be concluded that the present inventive method has a general applicability for plant polysaccharides.

Example 2

Figure 5:
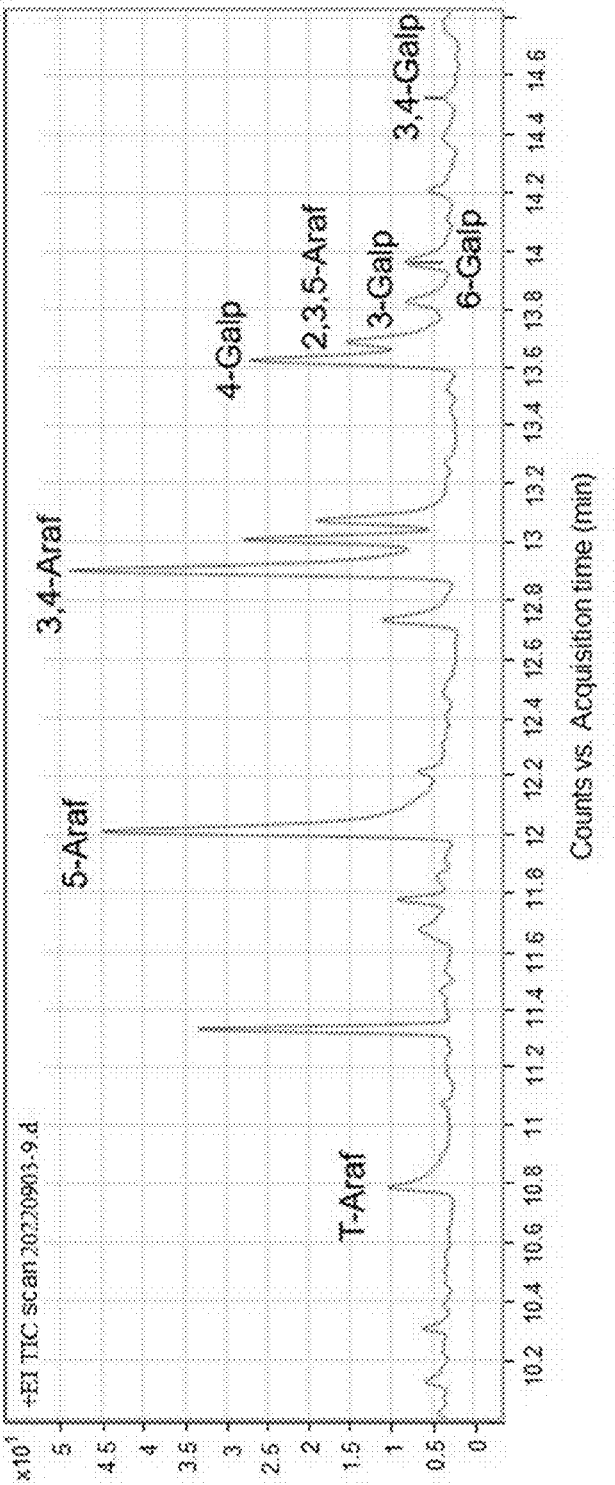
FIG. 5 is a GC-MS total ion chromatogram of conventionally methylated araban.

Analyzing Araban Glycosidic Bonds Using an Automatic High-Throughput Methylation Method:
Combined with Methylation Derivatization of Araban Using an High-Throughput Automatic Detection Equipment (1) Araban was taken and dispersed in 100 μL NaOH-DMSO suspension so that the concentration was 1 mg/mL, shaken at room temperature for 30 minutes, added with 40 μL iodomethane through an automatic pipetting device, and shaken for 1 hour; such process was repeated three times to obtain methylated and substituted polysaccharides;

(2) The methylated and substituted polysaccharides were placed in an ice bath with the robotic arm, added to 500 μL of water at a temperature of 0° C. to terminate the reaction, and stood still for 10 minutes;

(3) 800 μL of dichloromethane was added therein through an automatic pipetting device, shaken for 30 seconds, with the supernatant being removed;

(4) Steps (2) and (3) were repeated three times; then the lower organic layer was dried with nitrogen to obtain partially methylated glycoside residues;

(5) 100 μL of 2 M trifluoroacetic acid was added to the product of step (4), hydrolyzed at 100° C. for 8 hours, and blew and dried with nitrogen after the hydrolysis was completed;

(6) 100 μL of 0.2 M PMP methanol solution was added to the product of step (5), and heated in a 70° C. water bath for 30 minutes to obtain partially methylated PMP-derived glycoside residues;

(7) The product of step (6) was taken out and cooled at room temperature and dried in vacuum, dissolved in 1 mL of 70% methanol aqueous solution, and analyzed by LC-MS in MRM mode with the results shown in FIG. 5 and Table 2. Table 2 is the LC-MS analysis result of araban after high-throughput methylation-PMP derivatization, which shows araban has at least 27 different glycosidic bonds, composing of 1,5-linked Ara main chain (5-Ara, 23.02%), and a large number of branches linked at the 0-3 site of Ara (3,5-Ara, 17.42%), as well as a large number of T-Araf (17.4%), 3-Araf (4.57%), 4-Galp (11.91%), and 6-Galp (2.28%). Meanwhile, some 4-GalA (2.97%) and 3,4-GalA (0.4%) are also detected, indicating that part of pectin may be covalently linked with araban.

Comparative Example: Using a Conventional Methylation Method Combined with GC-MS Analysis of the Structure of Arabinose Methylation derivatization of araban using a conventional method takes a long time (2 d), a large amount of sample (>5 mg), and harsh reaction conditions—the whole process must be carried out in glassware. GC-MS detection was performed on the sample after the methylation was completed, and the results are shown in FIG. 6 and Table 3. Table 3 is the GC-MS analysis result of araban after traditional methylation. By comparing with the mass spectrometry database of PMAA derivatives (https://www.ccrc.uga.edu/specdb/ms/pmaa/pframe.html), it can be analyzed that the main glycosidic bonds are T-Araf (6.24%), 5-Araf (32.9%), 3,5-Araf (28.24%). The relative peak area reflects the main chain in araban is 1,5-linked Ara, and the branch sites on the Ara main chain are mainly located at the O-3 site of 1,3,5-Ara, with a small amount of sugar residues of 4-Galp, 3-Galp, 6-Galp, and 3,4-Galp.

Compared with the method of the present invention, the comparative example does not perform uronic acid reduction, and only the glycosidic bond type of neutral sugars can be analyzed using the methylation analysis result, lacking the information of glycosidic bonds of acidic sugars.

The present invention uses an automatic detection equipment for methylation combined with PMP derivatization to analyze glycosidic bonds in polysaccharides, which takes about 13 hours. Not only the glycosidic bond information of neutral sugars can be analyzed in the subsequent LC-MS mass spectrometry analysis, but also the glycosidic bond information of acidic sugars can be resulted, and the analysis results are faster, more detailed and more reliable.

TABLE 2

| Time | Linkage | degree of permethylation (DoPe) | precursor ion | Relative area % |
|---|---|---|---|---|
| 3.9 | 2,X-GalA | 1 | 539.2-217.1 | 0.07 (±0.03) |
| 5.72 | 3,4-GalA | 1 | 539.2-231.2 | 0.40 (±0.02) |
| 6.24 | 4-GalA | 2 | 553.3-231.2 | 2.97 (±0.13) |
| 6.6 | 2-Rha | 2 | 523.2-217.1 | 3.01 (±0.21) |
| 6.62 | 2,X,X-Glc | 1 | 525.2-217.1 | 0.12 (±0.02) |
| 6.79 | 2,4-Rha | 1 | 509.2-217.1 | 1.69 (±2.17) |
| 8.75 | 2,X,X-Glc | 1 | 525.2-217.1 | 0.15 (±0.02) |
| 9.49 | 2,X-Glc | 2 | 539.2-217.1 | 0.24 (±0.02) |

TABLE 2-continued

| Time | Linkage | degree of permethylation (DoPe) | precursor ion | Relative area % |
|------|---------|--------------------------------|---------------|-----------------|
| 9.57 | 3,4,6-Glc | 1 | 525.2-231.2 | 0.15 (±0.03) |
| 9.64 | 2,X-Ara | 1 | 495.2-217.1 | 2.42 (±0.15) |
| 9.81 | 3,5-Ara | 1 | 495.2-231.2 | 17.42 (±0.68) |
| 10.71 | 3,4-Gal | 2 | 539.2-231.2 | 1.19 (±0.05) |
| 10.87 | 3,4-Xyl | 1 | 495.2-231.2 | 0.39 (±0.03) |
| 11.24 | 3,5-Gal | 2 | 539.2-231.2 | 0.63 (±0.04) |
| 11.35 | 5-Ara | 2 | 509.2-231.2 | 23.02 (±0.69) |
| 12.1 | 2,4-Gal | 2 | 539.2-217.1 | 0.19 (±0.01) |
| 12.17 | 3-Ara | 2 | 509.2-231.2 | 4.57 (±0.19) |
| 12.34 | 4,6-Man | 2 | 539.2-231.2 | 1.57 (±0.07) |
| 12.46 | 6-Glc | 3 | 553.3-231.2 | 1.20 (±0.06) |
| 14.15 | 6-Gal | 3 | 553.3-231.2 | 2.28 (±0.09) |
| 14.49 | 2-Ara | 2 | 509.2-217.1 | 1.61 (±0.07) |
| 16.27 | X-Xyl | 2 | 509.2-231.2 | 1.17 (±0.05) |
| 16.94 | T-Ara | 3 | 523.2-231.2 | 17.40 (±0.50) |
| 18.85 | T-Rha | 3 | 537.3-231.2 | 1.60 (±0.16) |
| 19.31 | 4-Gal | 3 | 553.3-231.2 | 11.97 (±0.01) |
| 20.67 | T-Gal | 4 | 567.6-231.2 | 2.33 (±0.24) |
| 21.67 | T-Glc | 4 | 567.6-231.2 | 0.24 (±0.03) |

TABLE 3

| RT (min) | Type of linkage | Relative abundance (%) | major mass fragments (m/z) |
|----------|-----------------|------------------------|-----------------------------|
| 10.786 | T-Araf | 6.24 | 43、102、117、118、161、162 |
| 12.013 | 5-Araf | 32.9 | 43、71、86、117、118、233、234 |
| 12.9 | 3,5-Araf | 28.24 | 43、59、85、118、127、261 |
| 13.623 | 4-Galp | 13.82 | 43、59、71、87、102、118、233 |
| 13.682 | 2,3,5-Araf | 10.51 | 61、85、115、116、128、145、159、188、290 |
| 13.829 | 3-Galp | 3.85 | 43、59、87、101、118、129、161、234、277 |
| 13.959 | 6-Galp | 3.76 | 43、59、71、99、102、118、162、189、233 |
| 14.531 | 3,4-Galp | 0.67 | 43、59、87、118、129、143、305 |

The above only describes the preferred embodiments of the present invention, and does not limit the present invention in any form. Although the present invention has been disclosed as above preferred embodiments, it is not intended to limit the present invention. Anyone skilled in the art, without departing from the scope of the technical solution of the present invention, can make some changes or modifications to the technical solution disclosed above into equivalent embodiments. Without departing from the technical solution of the present invention, any modifications, equivalent changes and amendments made to the above embodiments based on the concept of the invention still fall within the scope of the technical solution of the present invention.

The invention claimed is:

1. A method for detecting glycosidic bonds of plant polysaccharides, comprising steps of:

(a) performing methylation of the plant polysaccharides;

(b) derivatizing glycosidic residues of the methylated plant polysaccharides with PMP reagent (1-phenyl-3-methyl-5-pyrazolone); and (c) performing mass spectrometry analysis by LC-MS; and wherein the steps (a)-(c) comprise steps of:

(1) dispersing the plant polysaccharides in 100 µL of NaOH-DMSO suspension to a concentration of 1 mg/mL and shaking at room temperature for 30 minutes, and adding 40 µL of iodomethane and shaking for 1 hour; repeating three times to obtain the methylated and substituted polysaccharides;

(2) placing the methylated and substituted polysaccharides in an ice bath, adding 500 µL of water of 0° C. to terminate reaction, and standing for 10 minutes;

(3) adding 800 µL of dichloromethane and shaking for 30 seconds, and removing supernatant;

(4) repeating steps (2) and (3) three times; then drying a lower organic layer with nitrogen to obtain partially methylated glycoside residues;

(5) adding 100 µL of 2 M trifluoroacetic acid to a product resulted from step (4), hydrolyzing at 100° C. for 8 hours, and blow drying with nitrogen after hydrolysis;

(6) adding 100 µL of 0.2 M PMP methanol solution to a product resulted from step (5), and heating in a 70° C. water bath for 30 minutes to obtain partially methylated PMP-derived glycoside residues; and (7) taking a product resulted from step (6) out, cooling at room temperature, drying in vacuum, dissolving in 1 mL of 70% methanol aqueous solution, and analyzing qualitatively and quantitatively by LC-MS in MRM mode.

2. A method for detecting glycosidic bonds of plant polysaccharides, comprising steps of:

(a) performing methylation of the plant polysaccharides;

(b) derivatizing glycosidic residues of the methylated plant polysaccharides with PMP reagent (1-phenyl-3-methyl-5-pyrazolone); and (c) performing mass spectrometry analysis by LC-MS; and wherein the steps (a)-(c) comprise steps of:

(1) dispersing the plant polysaccharides in 100 µL of NaOH-DMSO suspension to a concentration of 1 mg/mL and shaking at room temperature for 30 minutes, and adding 40 µL of iodomethane and shaking for 1 hour; repeating three times to obtain the methylated and substituted polysaccharides;

(2) placing the methylated and substituted polysaccharides in an ice bath, adding 500 µL of water of 0° C. to terminate reaction, and standing for 10 minutes;

(3) adding 800 µL of dichloromethane and shaking for 30 seconds, and removing supernatant;

(4) repeating steps (2) and (3) three times; then drying a lower organic layer with nitrogen to obtain partially methylated glycoside residues;

(5) adding 100 µL of 2 M trifluoroacetic acid to a product resulted from step (4), hydrolyzing at 100° C. for 8 hours, and blow drying with nitrogen after hydrolysis;

(6) adding 100 µL of 0.2 M PMP methanol solution to a product resulted from step (5), and heating in a 70° C. water bath for 30 minutes to obtain partially methylated PMP-derived glycoside residues; and (7) taking a product resulted from step (6) out, cooling at room temperature, drying in vacuum, dissolving in 1 mL of 70% methanol aqueous solution, and analyzing qualitatively and quantitatively by LC-MS in MRM mode, and wherein the plant polysaccharides are citrus pectin or araban.

* * * * *